United States Patent
De Filippis (10) Patent No.: US 8,384,256 B2
(45) Date of Patent: Feb. 26, 2013

(54) ROTARY ELECTRIC MACHINE AND THE METHOD FOR ASSEMBLING IT

(75) Inventor: Pietro De Filippis, Varazze (IT)

(73) Assignee: Spal Automotive S.r.l. (IT)

( * ) Notice: Subject to any disclaimer, the term of this patent is extended or adjusted under 35 U.S.C. 154(b) by 304 days.

(21) Appl. No.: 12/744,999

(22) PCT Filed: Nov. 28, 2008

(86) PCT No.: PCT/IB2008/055011
§ 371 (c)(1), (2), (4) Date: May 27, 2010

(87) PCT Pub. No.: WO2009/069103
PCT Pub. Date: Jun. 4, 2009

(65) Prior Publication Data
US 2010/0301690 A1 Dec. 2, 2010

(30) Foreign Application Priority Data
Nov. 30, 2007 (IT) .............................. BO2007A0791

(51) Int. Cl.
*H02K 1/32* (2006.01)
(52) U.S. Cl. ....................................... 310/64; 310/68 R
(58) Field of Classification Search .................... 310/64, 310/68 R, 67 R, 68 B, 68 C
See application file for complete search history.

(56) References Cited

U.S. PATENT DOCUMENTS

| | | |
|---|---|---|
| 5,604,412 A | 2/1997 | Okada |
| 5,783,881 A * | 7/1998 | Best et al. .................... 310/68 C |
| 6,081,056 A * | 6/2000 | Takagi et al. .................... 310/89 |
| 2002/0079755 A1* | 6/2002 | Sunaga et al. .............. 310/67 R |

FOREIGN PATENT DOCUMENTS

| | | |
|---|---|---|
| EP | 1324456 | 7/2003 |
| EP | 1523087 | 4/2005 |
| JP | 2002136056 | 5/2002 |

OTHER PUBLICATIONS

European Search Report and Opinion dated Sep. 1, 2009 from counterpart PCT patent application.

* cited by examiner

*Primary Examiner* — Nguyen N Hanh
(74) *Attorney, Agent, or Firm* — Timothy J. Klima; Shuttleworth & Ingersoll, PLC (57) ABSTRACT

An electric machine (1) comprises; a casing; a stator (3) fixed to the casing and including at least one electrical winding (5); a rotor (4) housed in the casing and rotatably connected to the latter; an electronic circuit (8) for powering the winding (5) at least partly housed in the casing; a cover (2a) for closing the casing to form with the latter a sealed enclosure; a terminal strip (9), accessible from outside the sealed enclosure, for controlling and powering the electronic circuit (8); a heat sink, embodied by the cover (2a), for absorbing the heat produced, in particular, by the electronic circuit (8). The machine (1) also comprises elastic elements (12) operating between the stator (3) and the electronic circuit (8) in such a way as to press the electronic circuit (8) against the heat sink.

23 Claims, 8 Drawing Sheets

ROTARY ELECTRIC MACHINE AND THE METHOD FOR ASSEMBLING IT

CROSS-REFERENCE TO RELATED APPLICATIONS

This application is the National Phase of International Application PCT/IB2008/055011 filed Nov. 28, 2008 which designated the U.S. and that International Application was published under PCT Article 21(2) in English.

This application claims priority to Italian Patent Application No. BO2007A000791 filed Nov. 30, 2007, and PCT Application No. PCT/IB2008/055011 filed Nov. 28, 2008, which applications are incorporated by reference herein.

TECHNICAL FIELD

This invention relates to a rotary electric machine, in particular an electric motor with built-in electronic control circuitry.

BACKGROUND ART

A rotary electric machine basically comprises a casing, a stator rigidly connected to the casing, a rotor, for example of the type with permanent magnets, enclosed by the casing and rotatably connected to the latter.

When the electric machine functions as a motor, the rotor is rotationally driven by powering the stator through an electronic circuit or control circuitry, which in this case, is also positioned inside the casing.

The casing is then closed by a cover with a terminal strip on the outside of it to power the electronic circuitry and, hence, the electric motor.

The control circuitry comprises a power circuit and must therefore be provided with a heat sink for absorbing the heat produced by the electronic power components during operation.

At the same time, the assembly must guarantee an efficient electrical connection between the electronic circuit and the electric motor so as to ensure that the motor operates correctly.

In the case of electric motors with built-in electronic circuitry, absorption of excess heat is not easy to achieve because it is difficult to make an effective electrical connection between the electronic circuitry and the motor and good thermal contact between the electronic circuitry and a corresponding heat sink, in particular the cover.

The main problems are due precisely to the fact that, because the casing has to be closed with the cover, it is difficult, with the motor substantially closed, to make all the electrical and mechanical connections in optimum manner.

To enable the assembly to be closed, prior art solutions provide at least one sliding contact, such as a connector, for example, which is easily subject to problems of reliability and efficiency for example on account of vibrations, contact wear, or operating temperature, between the motor and the electronic circuitry or between the electronic circuitry and the terminal strip.

In the first case, the electronic circuitry is rigidly connected to the cover in order to optimize heat exchange with the latter and, when the casing is closed, a sliding contact connects the electronic circuitry to the motor. In this case, therefore, the heat sink function takes priority over the reliability of the connection between the electronic circuitry and the motor.

In the second case, the electronic circuitry is effectively and rigidly connected to the motor, for example by soldering, whilst the contact of the circuitry with the cover is not particularly effective in terms of heat exchange on account of the necessary closing tolerances.

Thus, in the latter solution, the electronic circuitry is not effectively pressed against the heat sink, for example on account of assembly tolerances. Also, as already mentioned, there is normally a sliding contact, with all its inherent limitations, between the electronic circuitry and the terminal strip on the outside.

DISCLOSURE OF THE INVENTION

In this context, the main purpose of the invention is to propose a rotary electric machine, with electronic circuitry built into the casing, which overcomes the above mentioned disadvantages.

This invention therefore has for an aim to provide an electric machine that is more reliable than prior art solutions in terms of excess heat absorption and electrical connections inside it.

Another aim of the invention is to provide an electric motor with built-in electronic circuitry where the excess heat produced by the circuitry itself is effectively absorbed.

A further aim of the invention is to provide an electric machine with a reliable electrical connection between the electric motor and the electronic power circuitry.

A yet further aim of the invention is to provide an electric machine having an effective interconnection between the terminal strip and the motor.

The stated technical purpose and at least the specified aims are substantially achieved by an electric machine with the characteristics described in claim 1 and in one or more of the claims dependent thereon. The invention also relates to a method of assembling a rotary electric machine comprising the operating steps described in claim 19 and in one or more of the claims dependent thereon.

BRIEF DESCRIPTION OF THE DRAWINGS

Other characteristics and advantages of the invention are more apparent in the detailed description below, with reference to a preferred, non-limiting, embodiment of a rotary electric machine, as illustrated in the accompanying drawings, in which.

DETAILED DESCRIPTION OF THE PREFERRED EMBODIMENTS OF THE INVENTION

Figure 1:
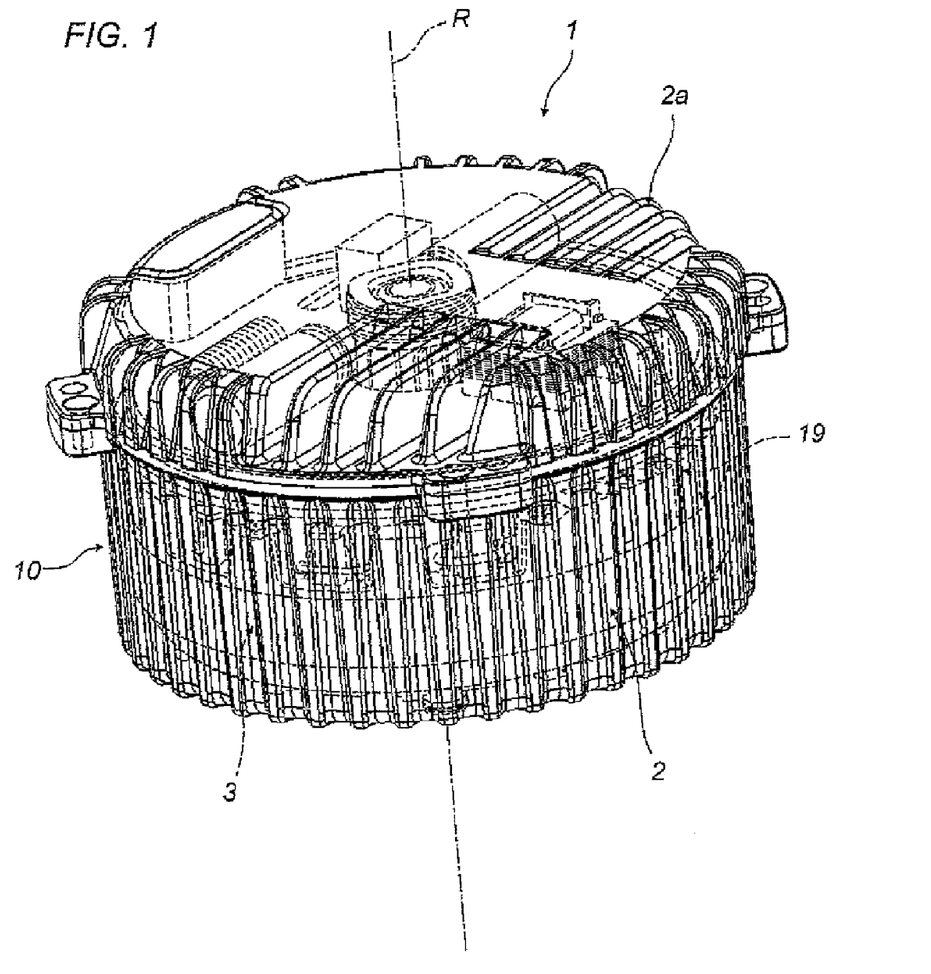
FIG. 1 is a schematic perspective view of a rotary electric machine according to this invention.

With reference to the accompanying drawings, in particular FIGS. 1 and 5, the numeral 1 denotes an electric machine according to this invention and the description of it given below is limited to the parts necessary to understand the invention.

Preferably, the machine 1 comprises an electric motor of the sealed type, that is to say without any opening giving access to the inside of it, to which this specification expressly refers but without limiting the scope of the invention.

The machine 1 comprises a casing 2 and a respective cover 2a which together form a sealed enclosure 10, a stator or stator unit 3 housed in the casing; and a rotor or rotor unit 4, housed in the casing 2 and rotatably connected to the latter.

Figure 2:
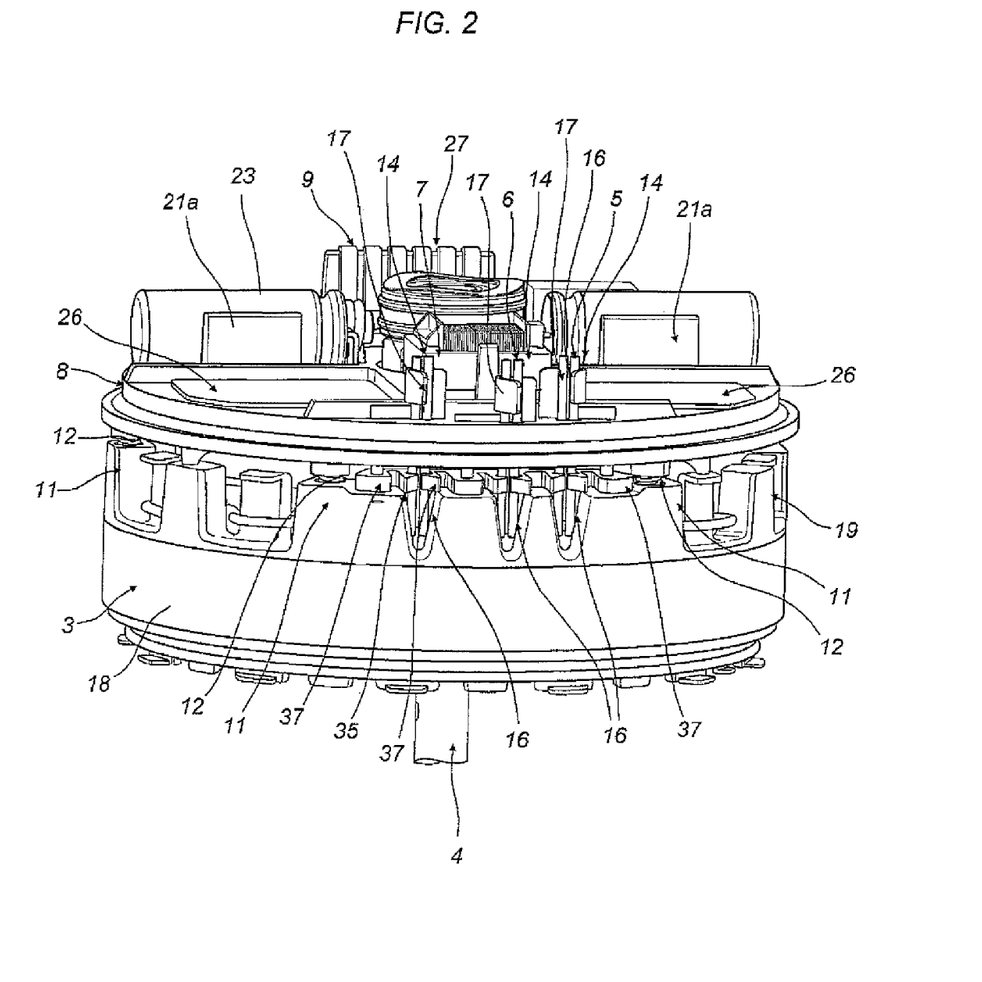
FIG. 2 is a schematic perspective view, with some parts cut away in order to better illustrate others, of the rotary electric machine of FIG. 1.
Figure 4:
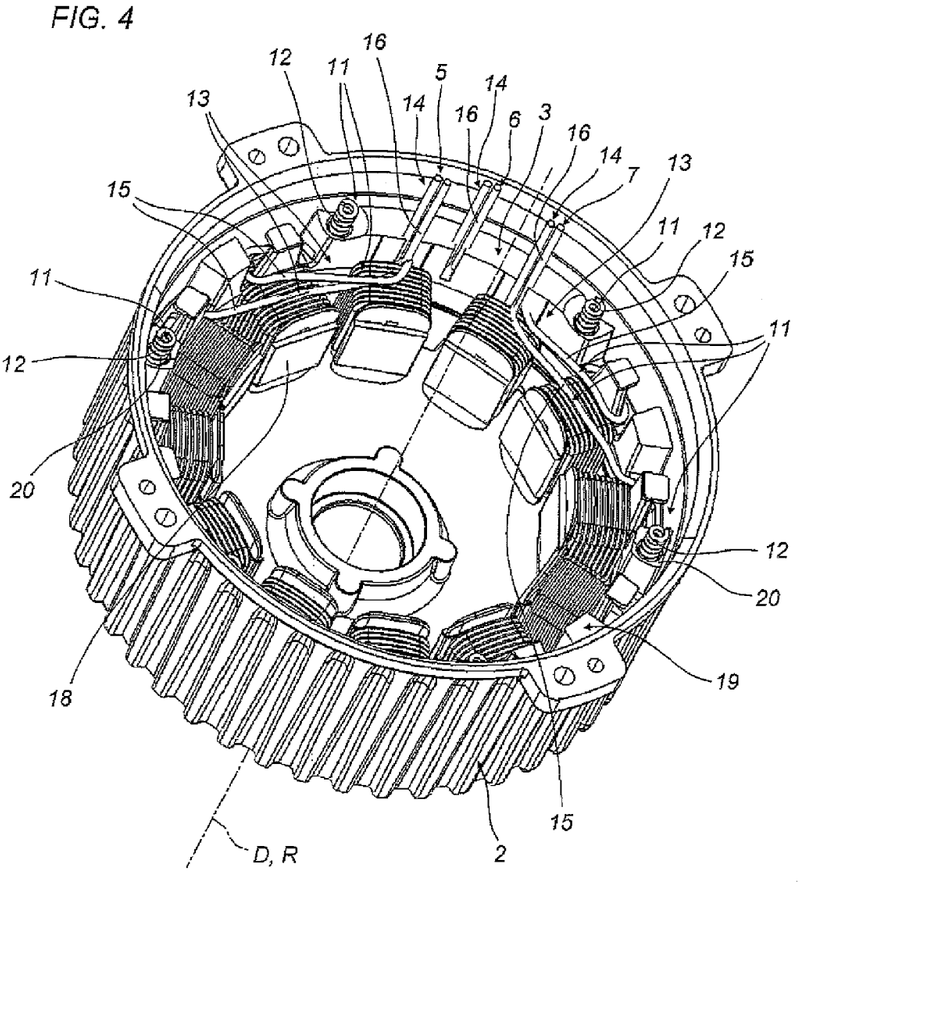
FIG. 4 is another perspective view of the electric machine of FIG. 1, with some parts cut away in order to better illustrate others.

With reference in particular to FIGS. 2 and 4, the stator 3, in the example illustrated, has three windings 5, 6, 7 and the machine 1 comprises an electronic circuit 8 for powering the windings 5, 6, 7.

The circuit 8 is advantageously housed in the casing 2 and a terminal strip 9 for powering the circuit 8 is accessible from outside the enclosure 10.

The machine 1 also comprises a heat sink for absorbing the heat produced, in particular, by the electronic circuit 8.

In this solution, the heat sink is embodied by the cover 2a which, as will become clearer as this description continues, is kept in thermal contact with the electronic circuit 8.

With reference in particular to FIG. 4, the machine 1 comprises elastic coupling or connecting means 11 operating between the stator 3 and the electronic circuit 8.

When the motor is closed, these connecting means 11 between the electronic circuit 8 and the stator enable the electronic circuit 8 not only to move closer to the stator 3, to which it is preferably connected rigidly and securely, as described in more detail below, but also to be pressed against the cover 2a.

As illustrated, the connecting means 11 comprise a plurality of elastic pushing elements 12 or, more specifically, springs which, when the machine is assembled, push the electronic circuit 8 towards the heat sink, away from the stator 3.

The elastic connecting means 11 also comprise a flexible portion 13 of the windings 5, 6, 7.

In other words, each of the windings 5, 6, 7 has at least one flexible portion 13, in particular, towards the stator 3, forming part of the elastic connecting means 11 in order to maintain a sure connection between the electronic circuit 8 and the windings 5, 6 and 7 while the circuit itself is being pressed against the cover 2a.

The electronic circuit 8 is, in particular, rigidly associated with the windings 5, 6, 7 at one end 14 of the respective flexible portion 13.

Looking more closely at the details in connection with the flexible portions 13, where the reference character R denotes the axis of rotation of the motor, substantially parallel to a coupling direction D along which the motor is assembled, said flexible portions have a first arm 15 substantially transversal to the direction D.

The arm 15 defines a sort of leaf-spring suspension system which allows the flexible portion 13 to move.

The electronic circuit 8 can thus move towards and away from the stator 3 according to the extension of the leaf springs.

In practice, the end portion of each winding, which, in the example illustrated, takes the form of two wires placed side by side, projects from a last coil, wound around a corresponding pole shoe, towards a point substantially where it is fixed to the electronic circuit 8.

Each flexible portion 13 also has a second arm 16 substantially parallel to the coupling direction D and extending towards the electronic circuit 8.

As illustrated in FIG. 2, the end 14 of the flexible portion 13 is defined by one end of the arm 16.

Each winding 5, 6, 7 is connected to the electronic circuit 8 at a respective tab 17 suitably provided in the electronic circuit 8 itself.

Advantageously, the ends 14 are soldered to the respective tabs 17.

The numeral 35 in FIGS. 2, 5 and 8 denotes in their entirety means for keeping the ends 14 in a position suitable for assembly, as explained in more detail below.

Figure 5:
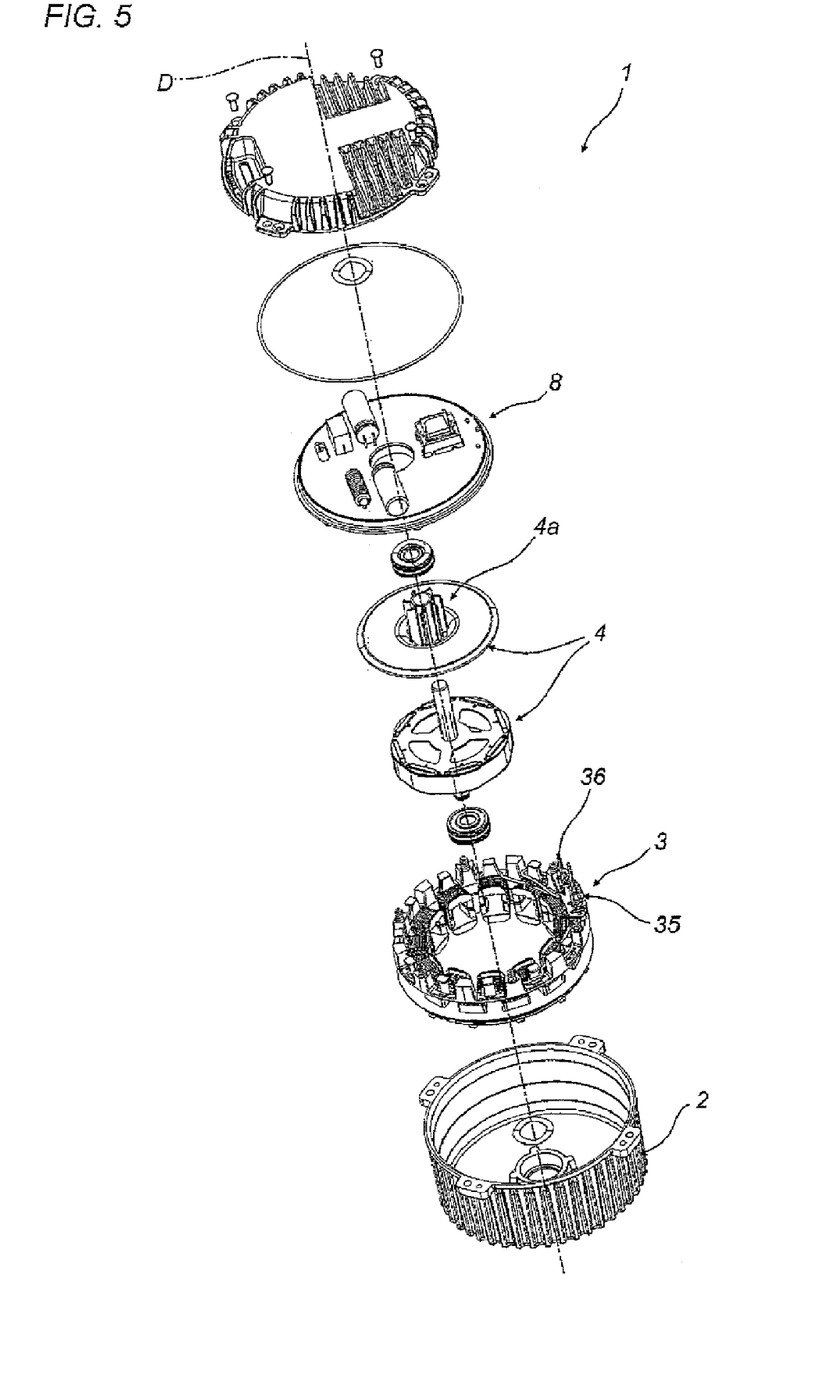
FIG. 5 is a schematic exploded view, with some parts cut away for greater clarity, of the electric machine of FIG. 1.

With reference to FIGS. 2 and 5, these means 35 comprise a plate-like element 36 having a plurality of seats 37 in which the flexible portions 13, in particular their second arms 16, are engaged.

The machine 1 comprises means 38 for coupling the element 36 to the stator 3 in such a way as to hold them substantially in place during assembly of the machine 1.

Figure 8:
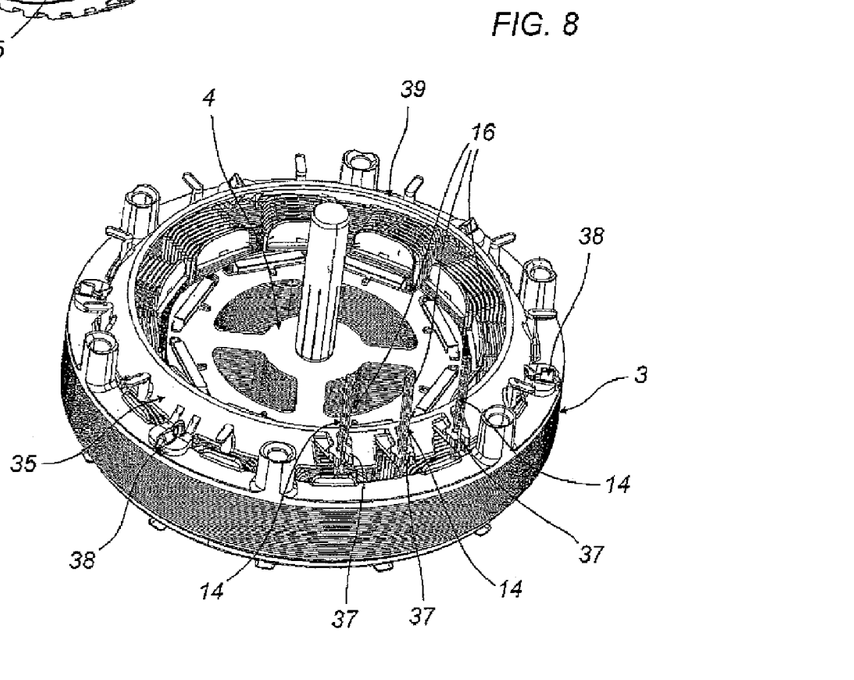
FIG. 8 illustrates a detail of a second embodiment of an electric machine according to the invention in a schematic perspective view

With reference to FIG. 8, the means 35 for keeping the ends 14 in a position suitable for assembly are embodied by a diffuser element 39 provided with seats 37 similar to those mentioned above.

The diffuser element 39 is substantially circular in section and has the shape of a truncated cone, with curved lateral surfaces.

The diffuser element 39 is housed in the casing 2, not shown in FIG. 8, and is connected to the stator 3 by the above mentioned coupling means 38.

It should be noticed that in this embodiment the element 39 is shaped in such a way as to keep the warm air which is produced inside the casing 2 and which is moved by the rotor 4, in particular by a fan 4a, into a zone inside the element 39 itself so as not to affect the electronic control circuit 8, or more specifically, a power circuit 22 forming part of the circuit 8 and described in more detail below.

In an alternative embodiment that is not illustrated, the means 35 are embodied by the arms 16.

In this embodiment, the arms 16 are themselves provided with a rigid structure that keeps them effectively in a position substantially parallel to the axis D.

The wires forming the end portion of the winding are, by way of example, wound round each other in a spiral and are thus sufficiently rigid to remain in place during assembly of the motor 1.

As regards the elastic elements 12, it should be noticed that the stator 3, which comprises a metal core or portion 18 with pole expansions, coated with an isolating portion 19, has a plurality of seats 20 for the elastic elements 12.

The seats 20 are formed in the isolating portion 19 and are preferably conical to facilitate insertion of the elastic elements 12.

In order to hold the elastic elements 12 in the correct position, thus keeping the circuit 8 pressed against the cover 2a, even under difficult working conditions which cause heating of the machine 1, the seats 20 are tubular, that is to say, they are open at one end in such a way that the elastic elements 12 rest on the metal portion 18.

Figures 6A, 6B:
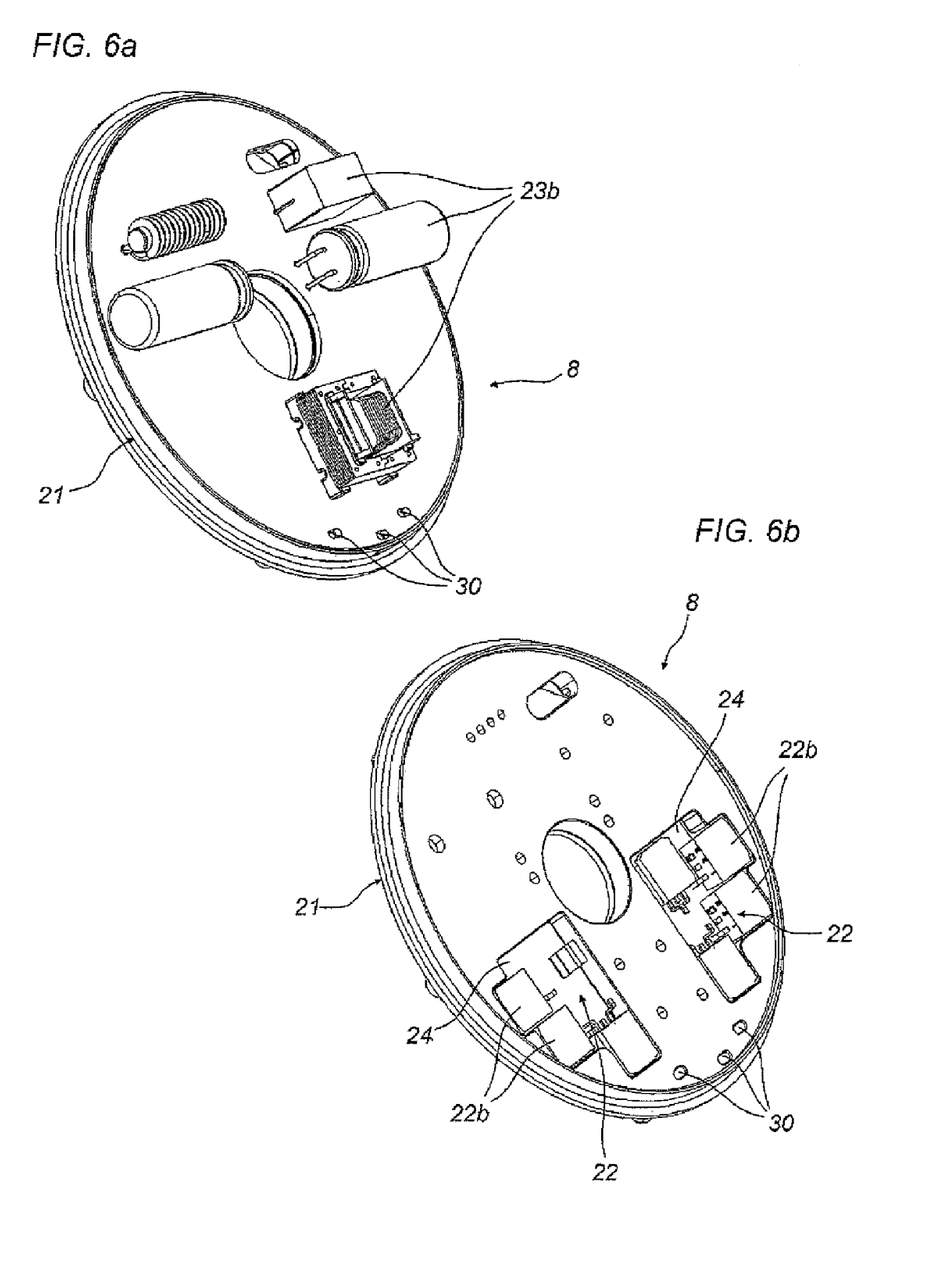
FIG. 6*a* illustrates a first detail of the electric machine according to the invention in a schematic perspective view.
FIG. 6*b* illustrates the detail of FIG. 6*a* in another schematic perspective view.
Figure 6C:
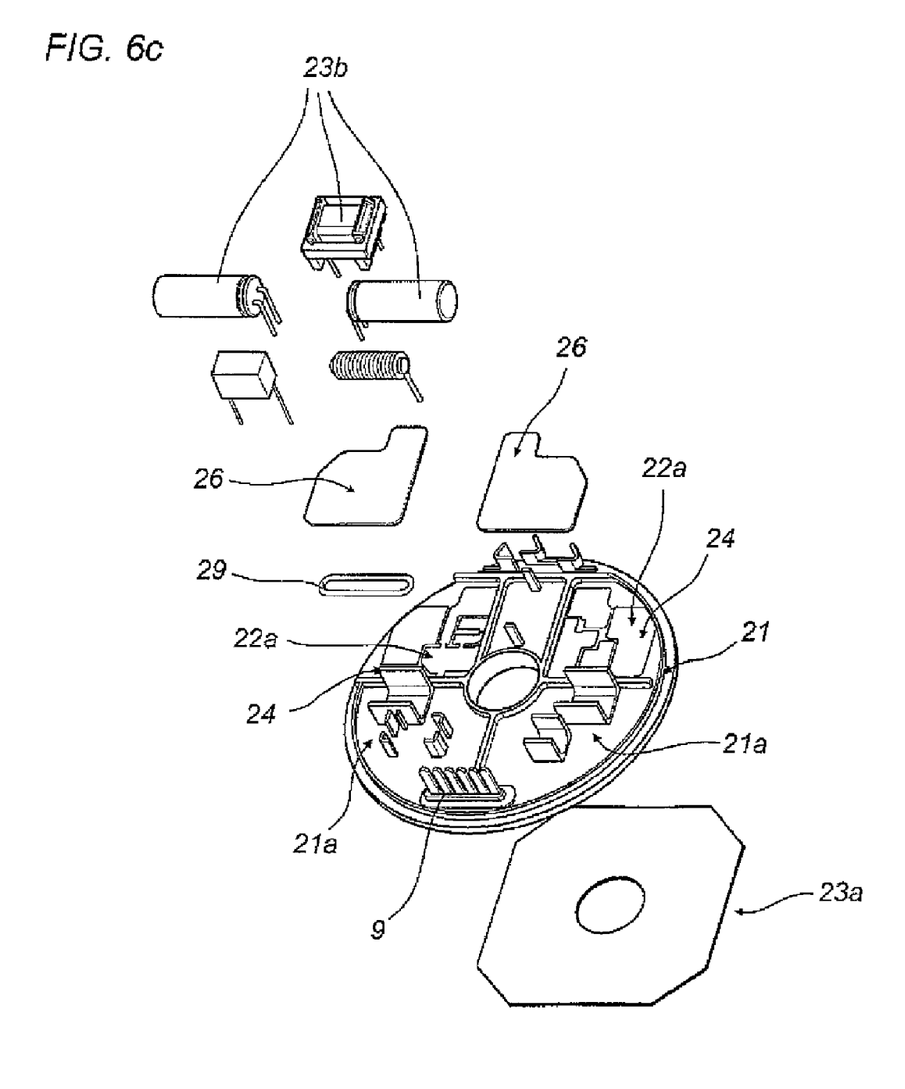
FIG. 6*c* illustrates the detail of FIGS. 6*a* and 6*b* in a schematic perspective view with some parts cut away for greater clarity.

FIGS. 6a, 6b and 6c in particular show how the electronic circuit 8 is mounted on a substantially disc-shaped mounting element 21 and the elastic pushing elements 12 operate between the stator 3 and the element 21.

The mounting element 21 has suitable mechanical properties to apply the pushing action against the cover 2a.

It should be noticed that the electronic circuit 8 comprises the power circuit 22, which produces most of the heat to be absorbed, and a signal circuit 23.

The power circuit 22 comprises conductive tracks 22a, for example of copper, on which are mounted substantially known electronic power components 22b, such as MOSFETs, for example, necessary for operation of the motor 1.

The signal circuit 23 comprises a multilayer printed circuit board 23a and a plurality of related passive electronic filtering and/or signal components 23b mounted on the circuit board 23a itself.

Preferably, the electronic power components 22b are mounted on the side opposite the passive electronic components 23b with respect to the mounting element 21.

In the preferred embodiment, the electronic power components 22b are mounted on the side opposite the cover 2a with respect to the mounting element 21.

Preferably, the electronic power components 22b are mounted directly on the mounting element 21.

It should be noticed that the mounting element 21 also comprises a plurality of elements 21a for individually fastening the passive electronic components 23b in such a way as to hold them firmly in place.

It is important to notice that this solution prevents high currents from flowing on a printed circuit that might be damaged or deteriorated by this type of current flow.

As illustrated in particular in FIG. 6c, the power circuit 22, in particular the tracks 22a, is accessible through the mounting element 21 in such a way that it can be placed in contact with the heat sink.

In practice, in the vicinity of the power circuit 22, the mounting element 21 has a pair of windows 24 giving access to the conductive tracks 22a of the circuit 22 itself.

Figure 7:
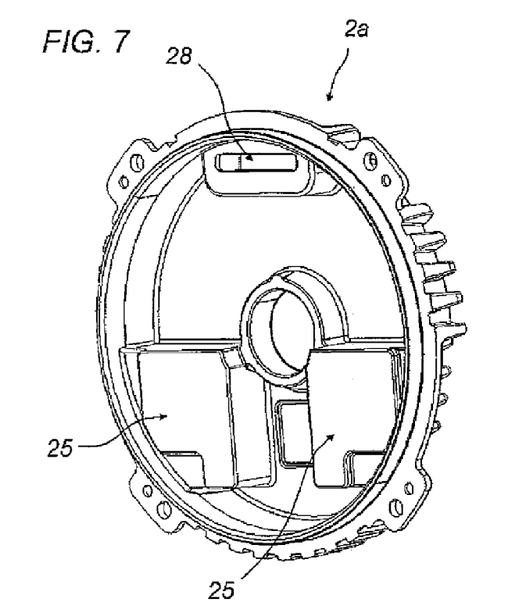
FIG. 7 illustrates a second detail of the electric machine according to the invention in a schematic perspective view.

As may be observed with reference in particular to FIG. 7, the cover 2a, which, as mentioned above, is a heat sink for the electronic circuit 8, has on the inside of it a pair of protuberances 25 located substantially at the windows 24 in such a way that it can come into contact with the power circuit 22, that is, with the conductive tracks 22a.

Advantageously, between the conductive tracks 22a of the power circuit 22 and the respective protuberance 25, the machine 1 comprises a thermally conductive, electrically insulating element 26, for example made of Silpad®.

It should be noticed that to enable the element 26 to function correctly, the elastic elements 12 are suitably dimensioned to press the power circuit 22 against the heat sink with a predetermined pressure.

For example, if Silpad® is used, the pressure required for correct operation is at least 1.5 kg per square centimeter.

The elastic elements 12 are designed and distributed to optimize the pushing force applied to the mounting element 21.

In particular, the elastic elements 12 are designed to apply the pushing force at the components of the power circuit 22 but without making the structure hyperstatic.

In the embodiment illustrated, the elastic elements 12 are divided into two sets of three, the elements in each set of three being spaced at angular intervals of 120°. In the preferred embodiment, the elastic elements 12 apply a pushing force of approximately 60 kg.

In the light of the above, when the cover is placed on the casing, the elastic elements 12 push the electronic circuit 8 against the cover 2a hard enough to guarantee good heat exchange, while the portions 13 allow an optimum connection to be maintained between the electronic circuit 8 itself and the stator windings.

Figure 3:
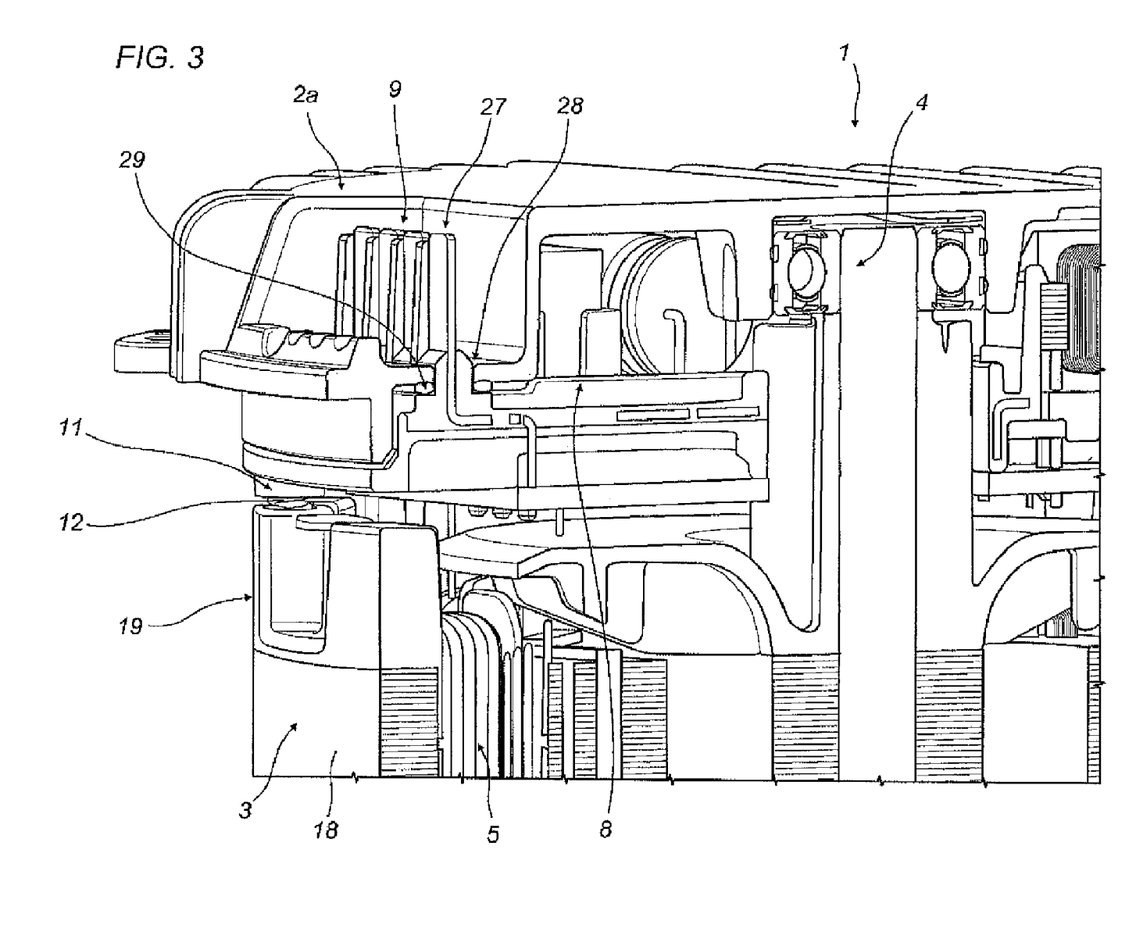
FIG. 3 is a schematic section view of the machine of FIG. 1, with some parts cut away in order to better illustrate others.

With reference to FIGS. 3 and 7, for powering the machine 1, the invention contemplates the provision of a terminal strip 27 protruding from the cover 2a through a suitable opening 28.

It should be noticed that at the opening 28, between the terminal strip 27 and the cover, there is an interposed gasket 29 that is pressed against the cover at the cover 2a by the elastic elements 12, thus guaranteeing an effective seal at the terminal strip 27 when the machine 1 is closed.

This invention also has for an object to provide a method for assembling the machine 1 as described in the foregoing, and, again, the description of it is limited to the parts necessary to understand the invention.

The assembly method comprises the steps of preparing the casing 2, placing the stator 3 with the windings 5, 6, 7 in the casing 2, placing the rotor 4 in the casing 2, rotatably connecting it to the latter, and preparing the elastic elements 12 on the stator 3.

The mounting element 21, with the electronic circuit 8, is then placed on the elastic elements 12 in such a way that each of the end portions 14 of the flexible portions 13 is located at a respective tab 17.

It should be noticed that at this stage the elastic elements 12 keep the electronic circuit 8 at a distance "d" from the stator 3, further away from the stator than it is when the motor is closed.

Thus, once the motor 1 is closed, the elastic elements 12 push the electronic circuit 8 against the cover/heat sink with the required force.

The ends 14 of the windings are then soldered to the respective tabs 17 to make an excellent, solid electrical contact between the two parts.

The next step is to place the cover 2a on the electronic circuit 8 and fasten it to the casing 2.

At this stage, as mentioned above, the elastic elements 12 push the circuit 8 towards the cover 2a, while the soldered flexible portions 13 allow it to be moved towards the stator 3 without compromising the electrical connection.

The leaf-spring portions make it possible to compensate assembly "clearances" without creating stress on the material, above all, at the solders.

In practice, the motor can be assembled in the traditional manner until fitting the rotor and the related supports which are not described.

The elastic elements 12 are housed in the stator and when the electronic circuit is inserted keep the latter clear of the stator 3 and casing 2.

Advantageously, the end portions 14 of the windings protrude from the mounting element 21 through suitably located respective holes 30 where the conductive tracks, on the side opposite the stator 3 with respect to the mounting element 21, are provided with the above mentioned tabs 17 to which the ends of the windings are soldered.

The means 35 keep the end portions 14 in a position suitable for insertion into the respective holes 30.

The mounting element 21 is preferably made of moulded plastic material and the conductive tracks of the electronic circuit 8 are buried in it, that is to say, the conductive tracks are formed at the same time as the mounting element 21 is moulded.

The invention has important advantages.

The elastic elements and the leaf-spring portions make the motor totally dependable in terms of both heat absorption and electrical connections.

The solution is especially advantageous for sealed motors which, although they have no openings giving access inside, can be assembled in optimal manner.

The invention described above may be modified and adapted in several ways without thereby departing from the scope of the inventive concept, as defined in the claims herein.

Moreover, all the details of the invention may be substituted by technically equivalent elements.

The invention claimed is:

1. An electric machine comprising:
    a casing;
    a stator fixed to the casing and including at least one electrical winding;
    a rotor housed in the casing and rotatably connected to the casing;
    an electronic circuit for powering the winding at least partly housed in the casing;
    a cover for closing the casing to form with the casing a sealed enclosure;
    a terminal strip, accessible from outside the enclosure, for controlling the electronic circuit;
    a heat sink for absorbing heat produced by the electronic circuit, the heat sink being embodied by the cover;
    an elastic connection operating between the stator and the electronic circuit;
    wherein the elastic connection comprises a flexible portion of the winding, the electronic circuit being rigidly associated with the winding at one end of the flexible portion.

2. The machine according to claim 1, wherein the elastic connection comprises a plurality of elastic elements for pushing the electronic circuit away from the stator towards the heat sink.

3. The machine according to claim 2, wherein the stator has a plurality of seats for the elastic elements.

4. The machine according to claim 3, wherein the stator comprises a metal portion at least partly coated with an isolating portion, the seats being formed in the isolating portion.

5. The machine according to claim 4, wherein the seats are cone-shaped.

6. The machine according to claim 4, wherein the seats are substantially tubular, the elastic elements resting on the metal portion.

7. The machine according to claim 2, and further comprising a mounting element for mounting the electronic circuit, the elastic elements operating between the stator and the mounting element.

8. The machine according to claim 7, wherein the electronic circuit comprises a power circuit.

9. The machine according to claim 8, wherein the electronic circuit comprises a signal circuit.

10. The machine according to claim 9, wherein the power circuit and the signal circuit are located on opposite sides of the mounting element.

11. The machine according to claim 10, wherein the power circuit comprises a plurality of electronic power components located on the side opposite the heat sink with respect to the mounting element.

12. The machine according to claim 11, wherein the power circuit comprises at least one conductive track positioned in the mounting element for connecting the electronic power components.

13. The machine according to claim 12, wherein the cover has at least one protuberance positioned on an interior thereof located substantially at the power circuit and at the at least one conductive track.

14. The machine according to claim 13, and further comprising a thermally conductive, electrically insulating element between the power circuit and the at least one protuberance of the heat sink.

15. The machine according to claim 1, wherein the flexible portion has a first arm substantially transversal to a coupling direction along which the cover is applied to the casing to form the enclosure, the coupling direction being parallel to an axis of rotation of the electric machine.

16. The machine according to claim 15, wherein the flexible portion has a second arm substantially parallel to the coupling direction, the electronic circuit being rigidly associated with the winding at one end of the second arm.

17. The machine according to claim 16, and further comprising a positioning mechanism for keeping the second arm in a position suitable for connection with the electronic power circuit.

18. A method for assembling an electric machine comprising:
    preparing a casing;
    placing a stator with at least one winding in the casing;
    placing a rotor in the casing and rotatably connecting the rotor to the casing;
    preparing an electronic circuit for powering the winding in the casing, the electronic circuit having a control terminal strip accessible from outside the casing;
    closing the casing with a cover to form a sealed enclosure, the cover constituting a heat sink for the electronic circuit;
    providing an elastic connection operating between the stator and the electronic circuit to press the electronic circuit against the cover and to enable the electronic circuit to be moved closer to the stator when the cover is closed;
    the providing an elastic connection comprising preparing the winding such that it is has a flexible portion where a rigid connection with the electronic circuit is made and which can move towards the stator when the cover is closed.

19. The method according to claim 18, and further comprising rigidly connecting the electronic circuit to the winding by soldering.

20. The method according to claim 19, wherein the step of providing an elastic connection comprises placing elastic elements between the stator and the electronic circuit.

21. The method according to claim 20, and further comprising successive steps of positioning the electronic circuit on the elastic elements, rigidly connecting by soldering, the flexible portion of the winding to a tab in the electronic circuit, positioning the cover on the electronic circuit and closing the casing, the elastic elements pressing the electronic circuit against the cover, the flexible portion contributing to moving the electronic circuit towards the stator.

22. An electric machine comprising:
    a casing;
    a stator fixed to the casing and including at least one electrical winding;
    a rotor housed in the casing and rotatably connected to the casing;
    an electronic circuit for powering the winding at least partly housed in the casing;
    a cover for closing the casing to form with the casing a sealed enclosure;
    a terminal strip, accessible from outside the enclosure, for controlling the electronic circuit;
    a heat sink for absorbing heat produced by the electronic circuit, the heat sink being embodied by the cover;

an elastic connection operating between the stator and the electronic circuit;

the elastic connection comprising a plurality of elastic elements for pushing the electronic circuit away from the stator towards the heat sink;

the stator having a plurality of seats for the elastic elements;

the stator comprising a metal portion at least partly coated with an isolating portion, the seats being formed in the isolating portion.

23. An electric machine comprising:

a casing;

a stator fixed to the casing and including at least one electrical winding;

a rotor housed in the casing and rotatably connected to the casing;

an electronic circuit for powering the winding at least partly housed in the casing;

a cover for closing the casing to form with the casing a sealed enclosure;

a terminal strip, accessible from outside the enclosure, for controlling the electronic circuit;

a heat sink for absorbing heat produced by the electronic circuit, the heat sink being embodied by the cover;

an elastic connection operating between the stator and the electronic circuit;

the electronic circuit comprising a power circuit;

the power circuit comprising at least one conductive track;

the cover having at least one protuberance positioned on an interior thereof located substantially at the power circuit and at the at least one conductive track.

* * * * *